United States Patent
Belenger et al.

(10) Patent No.: US 7,143,033 B2
(45) Date of Patent: Nov. 28, 2006

(54) AUTOMATIC MULTI-LANGUAGE PHONETIC TRANSCRIBING SYSTEM

(75) Inventors: Robert V. Belenger, Raynham, MA (US); Gennaro R. Lopriore, Somerset, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 784 days.

(21) Appl. No.: 10/124,706

(22) Filed: Apr. 3, 2002

(65) Prior Publication Data

US 2003/0191643 A1 Oct. 9, 2003

(51) Int. Cl.
G10L 15/26 (2006.01)

(52) U.S. Cl. ...................... 704/235; 704/246
(58) Field of Classification Search ................ 704/235, 704/246
See application file for complete search history.

(56) References Cited

U.S. PATENT DOCUMENTS

| | | | | |
|---|---|---|---|---|
| 4,435,617 A | * | 3/1984 | Griggs | 704/254 |
| 4,624,010 A | * | 11/1986 | Takebayashi | 704/249 |
| 4,975,962 A | * | 12/1990 | Oka | 704/241 |
| 5,202,926 A | * | 4/1993 | Miki | 704/222 |
| 5,884,256 A | * | 3/1999 | Bennett et al. | 704/235 |
| 6,108,627 A | * | 8/2000 | Sabourin | 704/243 |
| 6,236,964 B1 | * | 5/2001 | Tamura et al. | 704/254 |
| 6,263,308 B1 | * | 7/2001 | Heckerman et al. | 704/231 |

* cited by examiner

Primary Examiner—Daniel Abebe
(74) Attorney, Agent, or Firm—Jean-Paul A. Nasser; James M. Kasischke; Michael P. Stanley

(57) ABSTRACT

A multi-language phonetic transcribing system and method are provided for automatically transcribing speech into a phonetic equivalent. The phonetic transcribing system need only be able to recognize the limited number of phonemes of a particular language, e.g., the forty-two phonemes in the English language. Each language to be translated may be broken down into the phonetic elements and stored in a phonetic library for that language. The transcribing system detects speech, converts the speech to an electrical signal, and analyzes the frequency, amplitude, and timing characteristics of the speech to produce incoming phoneme information. The incoming phoneme information is compared to the phonetic elements in the active library. A correlator determines the degree of correlation between the incoming phoneme information and the stored information for each phoneme in the library. For each match, based on the degree of correlation, a respective phoneme is preferably stored and/or printed.

11 Claims, 3 Drawing Sheets

| | CONSONANT SOUNDS | | | WORD SOUND CODE | | | | | |
|---|---|---|---|---|---|---|---|---|---|
| 1 | P | AS IN | SIP | 0 | 0 | 0 | 0 | 0 | 1 |
| 2 | P | AS IN | PEN | 0 | 0 | 0 | 0 | 1 | 0 |
| 3 | B | AS IN | BIT | 0 | 0 | 0 | 0 | 1 | 1 |
| 4 | M | AS IN | MAP | 0 | 0 | 0 | 1 | 0 | 0 |
| 5 | W | AS IN | WIT | 0 | 0 | 0 | 1 | 1 | 1 |
| 6 | OU | AS IN | OUT | 0 | 0 | 0 | 1 | 1 | 0 |
| 7 | F | AS IN | FAT | 0 | 0 | 0 | 1 | 0 | 1 |
| 8 | V | AS IN | VAT | 0 | 0 | 1 | 0 | 0 | 0 |
| 9 | T | AS IN | THIN | 0 | 0 | 1 | 0 | 0 | 1 |
| 10 | TH | AS IN | THIS | 0 | 0 | 1 | 0 | 1 | 0 |
| 11 | ST | AS IN | STEP | 0 | 0 | 1 | 0 | 1 | 1 |
| 12 | T | AS IN | TIP | 0 | 0 | 1 | 1 | 0 | 0 |
| 13 | D | AS IN | DIP | 0 | 0 | 1 | 1 | 0 | 1 |
| 14 | N | AS IN | NIP | 0 | 0 | 1 | 1 | 1 | 0 |
| 15 | L | AS IN | LIP | 0 | 0 | 1 | 1 | 1 | 1 |
| 16 | TT | AS IN | UTTER | 0 | 1 | 0 | 0 | 0 | 0 |
| 17 | S | AS IN | SIP | 0 | 1 | 0 | 0 | 0 | 0 |
| 18 | Z | AS IN | ZIP | 0 | 1 | 0 | 0 | 1 | 0 |
| 19 | R | AS IN | RED | 0 | 1 | 0 | 0 | 1 | 1 |
| 20 | SS | AS IN | MISSION | 0 | 1 | 0 | 1 | 0 | 0 |
| 21 | S | AS IN | VISION | 0 | 1 | 0 | 1 | 0 | 1 |
| 22 | CK | AS IN | SICK | 0 | 1 | 0 | 1 | 1 | 0 |
| 23 | K | AS IN | KISS | 0 | 1 | 0 | 1 | 1 | 1 |
| 24 | G | AS IN | GIVE | 0 | 1 | 1 | 0 | 0 | 0 |
| 25 | NG | AS IN | KING | 0 | 1 | 1 | 0 | 0 | 1 |
| 26 | Y | AS IN | YET | 0 | 1 | 1 | 0 | 1 | 0 |
| 27 | I | AS IN | BITE | 0 | 1 | 1 | 0 | 1 | 1 |
| 28 | H | AS IN | HIT | 0 | 1 | 1 | 1 | 0 | 0 |

| | VOWEL SOUNDS | | | WORD SOUND CODE | | | | | |
|---|---|---|---|---|---|---|---|---|---|
| 29 | EE | AS IN | BEET | 0 | 1 | 1 | 1 | 0 | 1 |
| 30 | I | AS IN | BIT | 0 | 1 | 1 | 1 | 1 | 0 |
| 31 | I | AS IN | BID | 0 | 1 | 1 | 1 | 1 | 1 |
| 32 | AI | AS IN | AID | 1 | 0 | 0 | 0 | 0 | 0 |
| 33 | A | AS IN | AT | 1 | 0 | 0 | 0 | 0 | 1 |
| 34 | UR | AS IN | HURT | 1 | 0 | 0 | 0 | 1 | 0 |
| 35 | E | AS IN | BET | 1 | 0 | 0 | 0 | 1 | 1 |
| 36 | A | AS IN | ABOUT | 1 | 0 | 0 | 1 | 0 | 0 |
| 37 | U | AS IN | PUTT | 1 | 0 | 0 | 1 | 0 | 1 |
| 38 | A | AS IN | FATHER | 1 | 0 | 0 | 1 | 1 | 0 |
| 39 | OO | AS IN | FOOD | 1 | 0 | 0 | 1 | 1 | 1 |
| 40 | OO | AS IN | FOOT | 1 | 0 | 1 | 0 | 0 | 0 |
| 41 | OE | AS IN | TOE | 1 | 0 | 1 | 0 | 0 | 1 |
| 42 | AW | AS IN | LAW | 1 | 0 | 1 | 0 | 1 | 1 |

FIG. 3

AUTOMATIC MULTI-LANGUAGE PHONETIC TRANSCRIBING SYSTEM

STATEMENT OF THE GOVERNMENT INTEREST

The invention described herein may be manufactured and used by or for the Government of the United States of America for Governmental purposes without the payment of any royalties thereon or therefore.

CROSS REFERENCE TO OTHER PATENT APPLICATIONS

Not applicable.

BACKGROUND OF THE INVENTION (1) Field of the Invention

The present invention relates generally to systems and methods for transcribing speech and, more particularly, to an automatic system that may be utilized to phonetically transcribe speech in one or more languages.

(2) Description of the Prior Art

The use of the stenograph or other shorthand systems for transcribing the discussions of important conferences, legal hearings, or governmental meetings, presently requires the services of highly trained and experienced personnel. As well, audio recording devices are often utilized for backing up the personnel to prevent loss of data. If more than one language is being spoken, the transcribing of all the languages requires the additional use of people trained in the transcription of each language used. In the multi-cultural, multi-lingual environment of the United States, the problem of transcribing the conversations of important events or meetings can literally require an army of highly skilled stenographically trained people. As more and more countries become international in their business, legal, military and other matters, the situation will not improve.

While automatic speech recognition systems are well known in the prior art, such systems require a fast computer and a highly complex program for every different language being transcribed. Speech recognition software and systems must solve the extremely difficult and complex problem of speech recognition to provide the transcription of speech to typewritten text. For the English language alone, a speech recognition program must be able to recognize hundreds of thousands of words, many of which are pronounced identically but spelled differently and have different meanings. Due to the complexity of language, speech recognition programs tend to produce many errors. The use of speech recognition systems for automatic transcription such as the complex computer based speech recognition programs is made even more complex if multiple languages need transcription. Due to the complexity of most languages, each speech recognition program must be specifically tailored to a particular language. Even then, the error rates of transcription can be quite high. Therefore, it would be desirable to provide a system that does not depend on the solution to the difficult and complex problem of speech recognition to provide the transcription of speech to typewritten text.

Various inventors have attempted to solve related problems to those discussed above as evidenced by the following patents:

U.S. Pat. No. 6,219,646 B1, issued Apr. 17, 2001, to Julius Cherny, discloses methods and apparatus for performing translations between different languages. The invention includes a translation system that performs a translation having increased accuracy by providing a three-dimensional topical dual-language database. The topical database includes a set of source-to-target language translations for each topic that the database is being used for. In one embodiment, a user first selects the topic of conversation, and then words spoken into a telephone are translated and produced as synthesized voice signals from another telephone so that a near real-time conversation may be had between two people speaking different languages. An additional feature of the present invention is the addition of a computer terminal that displays the input and output phrases so that either user may edit the input phrases, or indicate that the translation was ambiguous and request a rephrasing of the material.

U.S. Pat. No. 6,212,497 B1, issued Apr. 3, 2001, to Araki et al., discloses a word processor which comprises: a voice inputting device for inputting spoken word and converting the spoken word into voice data; a voice storage device for storing the voice data; a speech recognition device for recognizing a word in the voice data output from the voice inputting device or the voice data stored by the voice storage device; a display for displaying a result obtained by the voice recognition device; an instruction inputting device for inputting an instruction to select a portion in the result; and a correction device for correcting the portion in the result according to the instruction from the instruction inputting device.

U.S. Pat. No. 6,148,105, issued Nov. 14, 2000, to Wakisaka et al., discloses a study system of a voice recognizing and translating system with a sound data base for storing data from which noise is removed; a sound analysis unit for extracting the features of the voice corresponding to the voice data stored in the sound data base; and a model learning unit for creating an acoustic model on the basis of the analysis result of the sound analysis unit. A recognition system of the voice recognizing and translating system is provided with: an acoustic model storing unit for storing acoustic models; a second sound analysis unit for extracting the feature of the voice corresponding to the data concerned on the basis of the data obtained by removing the data representing noise from the voice data of a newly input voice, and a voice collating unit for collating the voice data obtained by the second sound analysis unit with the data of the acoustic models so as to recognize the voice.

U.S. Pat. No. 6,125,341, issued Sep. 26, 2000, to Raud et al., discloses a speech recognition system having multiple recognition vocabularies, and a method of selecting an optimal working vocabulary used by the system. Each vocabulary is particularly suited for recognizing speech in a particular language, or with a particular accent or dialect. The system prompts a speaker for an initial spoken response; receives the initial spoken response; compares the response to each of a set of possible responses in an initial speech recognition vocabulary to determine a response best matched in the initial vocabulary. A working speech recognition vocabulary is selected from a plurality of speech recognition vocabularies, based on the best matched response.

U.S. Pat. No. 6,122,614, issued Sep. 19, 2000, to Kahn et al., discloses a system for substantially automating transcription services for multiple voice users including a manual transcription station, a speech recognition program and a routing program. The system establishes a profile for each of the voice users containing a training status which is selected from the group of enrollment, training, automated and stop automation. When the system receives a voice dictation file from a current voice user based on the training status the system routes the voice dictation file to a manual transcription station and the speech recognition program. A human transcriptionist creates transcribed files for each received voice dictation files. The speech recognition program automatically creates a written text for each received voice dictation file if the training status of the current user is training or automated. A verbatim file is manually established if the training status of the current user is enrollment or training and the speech recognition program is trained with an acoustic model for the current user using the verbatim file and the voice dictation file if the training status of the current user is enrollment or training. The transcribed file is returned to the current user if the training status of the current user is enrollment or training or the written text is returned if the training status of the current user is automated. An apparatus and method is also disclosed for simplifying the manual establishment of the verbatim file. A method for substantially automating transcription services is also disclosed.

U.S. Pat. No. 5,917,944, issued Jun. 29, 1999, to Wakisaka et al., discloses a study system of a character recognizing and translating system with a character data base for storing character data representing characters contained in a sensed image; a character shape analysis unit for analyzing the shape of a character to extract the features of character constituting elements constituting the character; and, a mask learning unit for generating sample mask data of the character constituting elements on the basis of the analysis result of the character shape analysis unit. A recognition system of the character recognizing and translating system is provided with a collating unit for collating the character data of a character to be recognized with the sample mask data so as to recognize the character.

U.S. Pat. No. 5,835,854, issued Nov. 10, 1998, to Palisson et al., discloses an RDS/TMC receiver or a traffic guidance system including a unit for indicating on a display or by speech synthesis proper names or place names, for example, alternately in the language of the user and in the language of the country the user travels through, while the other words of the message are indicated only in the user's language. The translations are found in a memory. The guidance system may be used, for example, as a guiding and/or information system for the motorist.

U.S. Pat. No. 5,751,957, issued May 12, 1998, to Hiroya et al., discloses a multi-language compatible service offering/receiving system. A service server and a service client are connected to a translation rule managing server that is connected for managing translation rules for translating information expressing forms by way of an intermediate expression form. Upon sending of information from the service server to the service client, the service server translates a specific language contained in the data to be sent out into a language of the intermediate expression by referencing the translation rules. The service client translates the intermediate expression into specific expression by using the translation rules for displaying the data resulting from the translation. When the translation rules are unavailable in the service server and the service client, the translation rule is acquired from the translation rule managing server.

The above-described patents do not solve the problem of providing an automatic system capable of accurately transcribing and providing a written record of speech in one or more languages. Consequently, there remains a long felt but unsolved need for an improved automatic transcription system and method. Those skilled in the art will appreciate the present invention that addresses the above and other problems.

SUMMARY OF THE INVENTION

Accordingly, it is an objective of the present invention to provide an improved transcribing system and method.

Another objective is to provide a system and method as aforesaid which provides a system and method that is readily operable with multiple languages.

A further objective is to provide a system and method as aforesaid whereby the transcriber records phonetic sounds of a language.

These and other objectives, features, and advantages of the present invention will become apparent from the drawings, the descriptions given herein, and the appended claims. However, it will be understood that above listed objectives and advantages of the invention are intended only as an aid in understanding aspects of the invention, are not intended to limit the invention in any way, and do not form a comprehensive list of objectives, features, and advantages.

In accordance with the present invention, a system is provided for a transcriber for transcribing speech which may comprise one or more elements such as, for instance, a sound transducer for converting the speech to an electrical signal and/or a speech analyzer operable for analyzing the electrical signal and producing a digital signal containing incoming phoneme information. Other elements may include at least one phonetic library stored in a digital memory wherein are stored a plurality of phonemes, and a phoneme sound correlator operable for comparing the digital signal containing incoming phoneme information to the plurality of phonemes stored in the phonetic library.

In another preferred embodiment, the speech analyzer is operable for measuring an amplitude and frequency content related to the speech and associating timing information therewith to produce the incoming phoneme information. The incoming phoneme information is then digitized for comparison with phonemes stored in the active phoneme library.

In a preferred embodiment, the transcriber may further comprise a match detector for indicating a match between the incoming phoneme information and the plurality of phonemes stored in the phonetic library. The match detector preferably indicates a match between the incoming phoneme information and the plurality of phonemes stored in the phonetic library depending on a predetermined level of correlation.

A phoneme buffer and/or other storage means may be provided for storing detected phonetic phonemes in response to an indication of the match between the incoming phonemes and the plurality of phonemes stored in the phonetic library.

Preferably the system further comprises a printer for printing phonetic equivalents of the detected phonemes. A phoneme encoder is then preferably provided for converting the detected phonemes to a format compatible with the printer.

In operation, a method is provided for transcribing speech which may comprise one or more method steps such as, for instance, storing a plurality of phonemes in a digital format in one or more phoneme libraries, converting the speech to an electrical signal, processing the electrical signal to produce a digital signal, comparing the digital signal to the plurality of phonemes stored in the one or more phoneme libraries for determining a plurality of matches therebetween, and storing a plurality of phonemes in response to the determining of the plurality of matches.

The method may further comprise providing a plurality of phoneme libraries and selecting a phoneme library corresponding to the language of speech.

The step of processing may preferably comprise detecting frequency, amplitude, and timing information from the electrical signal to produce the digital signal. The step of comparing may further comprise comparing the frequency, amplitude, and timing information in the digital signal to frequency, amplitude, and timing information related to the plurality of phonemes stored in the one or more phoneme libraries for determining the plurality of matches. The method may further comprise determining a correlation factor in response to the step of comparing and then comparing the correlation factor with a predetermined correlation factor for determining the plurality of the matches.

In other words, the transcriber may comprise a sound transducer for converting the speech to an electrical signal, a speech analyzer operable for producing a digital signal containing incoming phoneme information related to an amplitude, frequency, and timing of the speech, at least one phonetic library stored in digital memory containing a plurality of phonemes, and a match detector for determining a match between the incoming phoneme information and the plurality of phonemes stored in the phonetic library.

The transcriber may further comprise a phoneme sound correlator for determining a degree of correlation between the incoming phoneme information and the plurality of phonemes stored in the phonetic library.

Other elements may further comprise a plurality of phoneme libraries, and a switch for selecting a particular phoneme library corresponding to a language of the speech.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein corresponding reference characters indicate corresponding parts throughout several views of the drawings and wherein:

FIG. 3 is a table showing English phonemes and one possible encoding scheme.

BRIEF DESCRIPTION OF THE PREFERRED EMBODIMENTS

Figure 1:
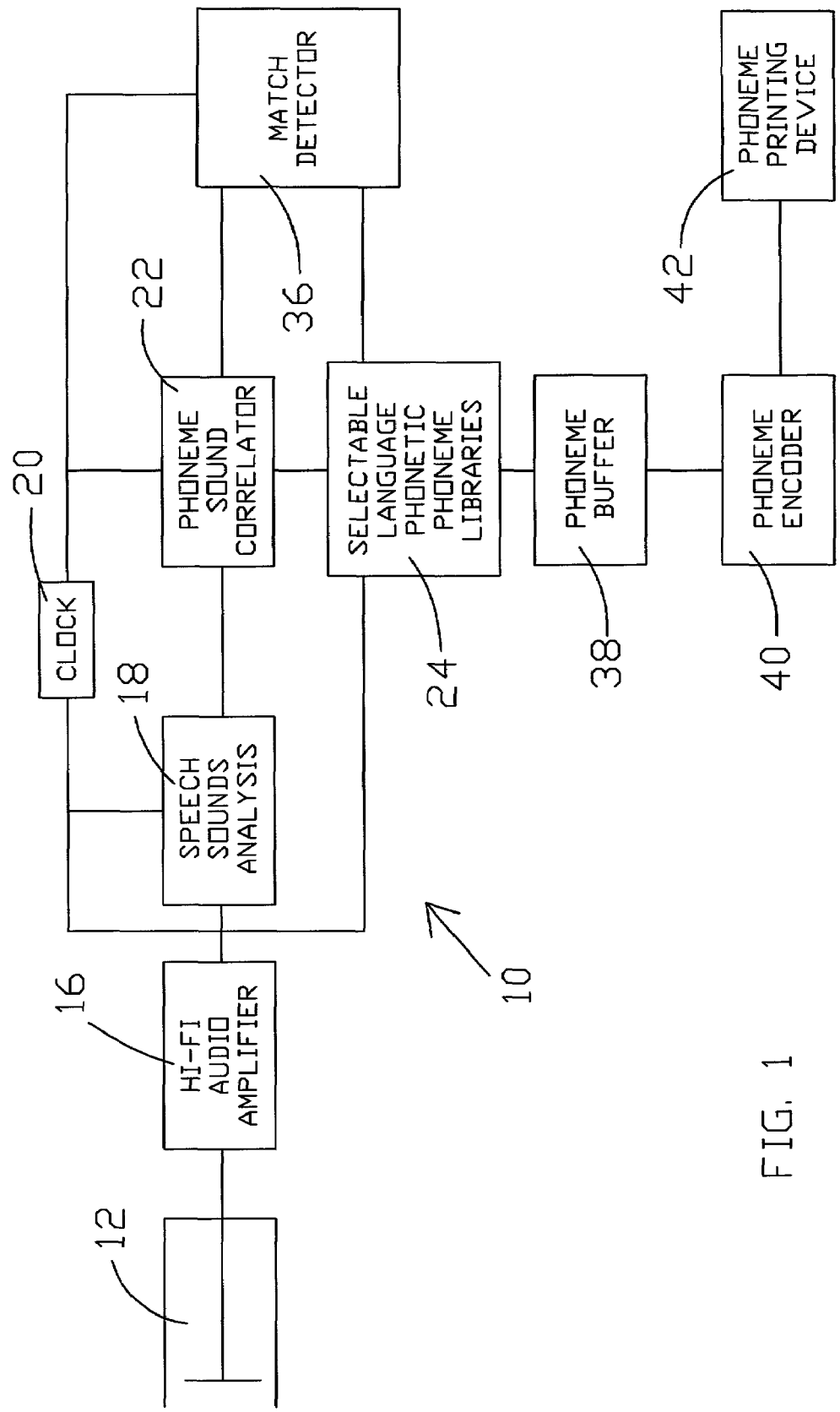
FIG. 1 is a functional block diagram schematic showing an automatic multi-language transcribing system in accord with the present invention.

Referring now to the drawings and, more specifically to FIG. 1, there is shown system 10 which provides a functional block diagram that outlines a presently preferred embodiment of an automatic multi-language phonetic transcribing system in accord with the present invention. System 10 permits the automatic transcription of verbal exchanges e.g., the typed record of the proceedings of a meeting, hearing, court session, etc. without a human having to manually operate a stenographic type machine or other keyboard device. The transcription is printed in a phonetic format using the basic phonemes of the particular language being spoken. The result is a printed text that, when read phonetically, imitates the phonetic pronunciation of the word in whatever language is being transcribed. System 10 can be operated to select any language for transcription for which it has a library of phonemes as functionally shown in FIG. 2. While the printed phonetic text can be readily read back by one who can read the phonetic text, a machine, which may have a desired or selectable voice quality, may also be utilized to read back the phonetic information of the speech stored in a digital memory.

While the present specification focuses in some detail on the problem of automatic transcription from an English language point of view, system 10 can also be used to address the problem in any language using that language's basic word sounds (phonemes) as will be discussed in more detail hereinafter. System 10 of the present invention greatly reduces the complexity of automatic transcribing and permits a quick read back of the spoken words when needed in the same language in which they were spoken. System 10 also provides a phonetically correct, permanent record of the spoken words in the language being transcribed/spoken.

Figure 2:
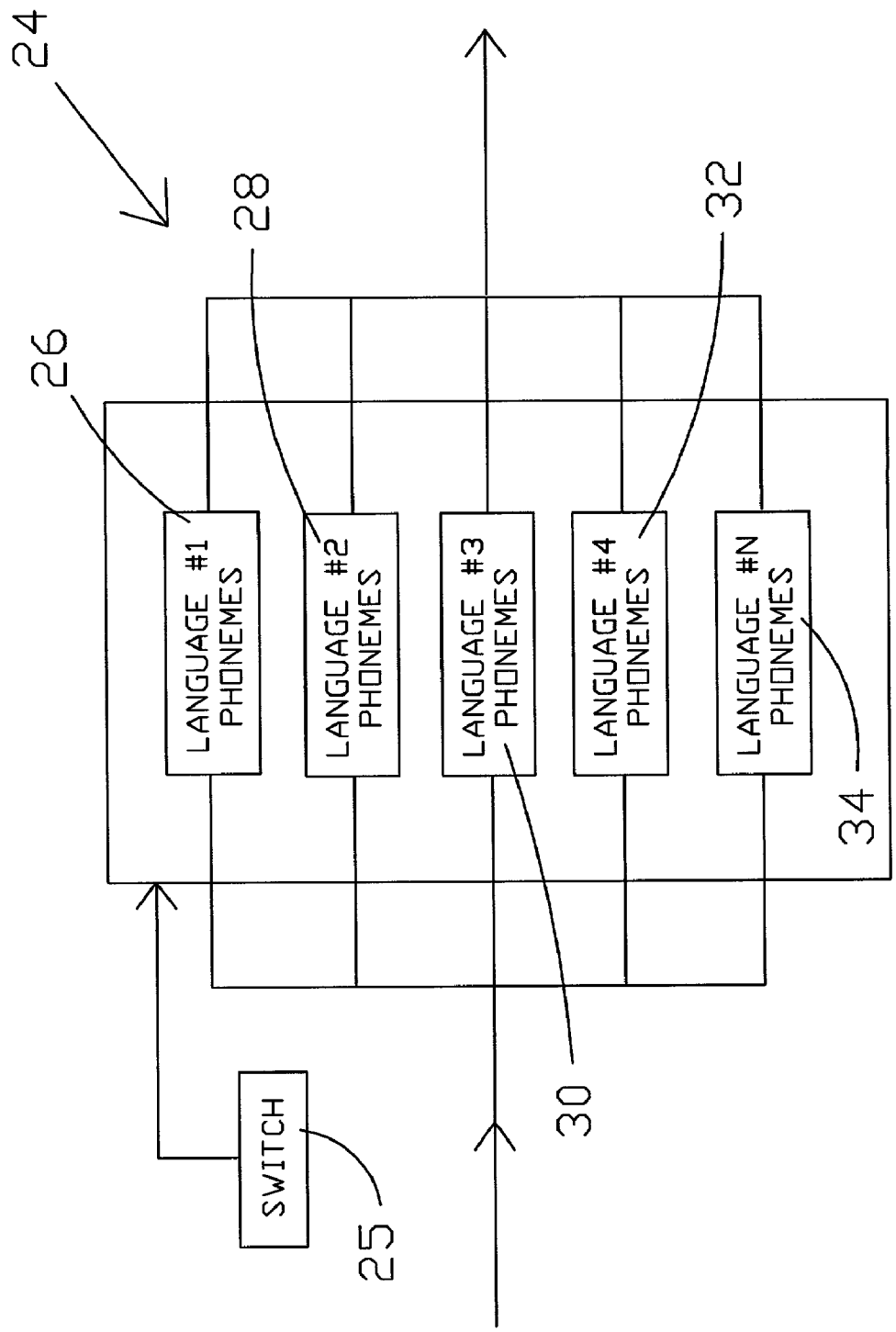
FIG. 2 is a functional block diagram schematic showing a multiple language phoneme library for use with the transcribing system of FIG. 1.

In accord with the present invention, system 10 as described in FIG. 1 and FIG. 2 need only consider the speech sounds or phonemes of a language. In the English language, the present technique requires only 42 phonemes for dynamic transcription of speech to typewritten words as indicated in the table shown in FIG. 3. Other languages or systems of word sounds may have more or less phonemes. The International Phonetics Alphabet, usable for many languages, has a more extensive set of word sounds, but can be addressed in a similar manner. French, Spanish, German, Italian, Japanese, and the like, are languages which have their own set of basic word sounds.

The phonemes comprising the words in a phrase or sentence are sensed via electro-acoustic transducer assembly 12, which may be a directional microphone, or other types of microphone(s) as deemed most suitable for the environment of operation. Electro-acoustic transducer assembly 12 may also comprise background noise canceling circuitry as well as special, selectable and/or adjustable frequency response circuitry and the like, as desired. Signal 14 so produced by electro-acoustic transducer assembly 12 may be amplified by high fidelity amplifier 16 to a signal/power level sufficient to permit the analysis and breakdown of the word sounds into amplitude and frequency characteristics in a time sequence by speech sound analyzer 18 as coordinated by system clock 20.

The sound characteristics are preferably digitized in speech sound analyzer 18 and then correlated in phoneme sound correlator 22 with respect to the contents of the phonetic phoneme libraries 24 that contain the phoneme set for the particular language being used as for which it is set as shown in more detail in FIG. 2. Switch 25 may be utilized to select the desired phoneme library. For a multiple language meeting and transcriptions, a separate system 10 can be placed in front of or in proximity to the different language speakers. The proper library of the group of libraries shown in FIG. 2, such as a particular library from libraries 1, 2, 3 . . . n, as designated by numerals 26, 28, 30, 32, and 34, may then be activated to transcribe the speaker's language.

Correlator 22 then compares the incoming digitized phoneme with the contents of the library, e.g., libraries 26–34, that contains the phoneme set for the particular language being transcribed. Correlator 22 compares the incoming digitized phoneme with the contents of the selected library to determine which of the phonemes in the library, if any, match the incoming sound of interest. Correlator 22 produces a correlation factor that is used by match detector 36 to verify that a match has been made between the incoming sound and the sounds stored in active library 24. When a match is detected, the phoneme of interest is copied from library 24 and sent to phoneme buffer 38. In phoneme buffer 38, phonetic phonemes are stored momentarily, arranged in their proper time sequence, and then passed on to a phoneme encoder 40. Phoneme encoder 40 converts the digitized phonemes to a format compatible with phoneme printing device 42, where the phonetic equivalents of the words being spoken are printed.

In FIG. 3, the table shows an example of one possible encoding scheme for the English language phoneme set although other encoding schemes could also be utilized. The word sound codes would activate the proper phoneme printing head as the encoded phonemes are received by the printer. Phoneme #29, for example, has a word sound code of 011101 which, when received by the printer, activates the printing head that would cause "ee" to be printed. The phonemes would preferably be printed in time sequence with suitable spacing to indicate short and long pauses whereby short pauses separate words and long pauses separate sentences.

Thus, in operation high fidelity microphone 12, which may be an active or passive transducer system, provides the desired frequency characteristics for optimal signal production. The appropriate frequency range is amplified with a desired response characteristic by acoustic amplifier 16. Speech sound analyzer 18 determines the amplitude and frequency content of the speech sound phonemes and their time sequence. This information is converted to a digital format for use by the phoneme sound correlator 22. Correlator 22 uses the digitized data contained in the phoneme of interest and the time sequence of the data to query the selected language phonetic phoneme library 24 where the appropriate phoneticized alphabet of word sounds are stored in digital format. Successive phoneme characteristics are compared to the incoming phoneme of interest in correlator 22. A predetermined correlation factor is used by match detector 36 as a basis for determining a "matched" or "not matched" condition. A match is detected by the match detector 36 when it senses a predetermined level of correlation between an incoming phoneme and one resident in the phoneme library. Selectable libraries 26–34 contain all the word sounds (phonemes) of the phonetic alphabets of the different languages covered by the library set characterized by their relative amplitude and frequency content in a time sequence. When the match detector 36 signals a match, the appropriate digitized phonetic phoneme is passed to the phoneme buffer 38. Phoneme buffer 38 momentarily stores the phonetic phonemes, assembling and arranging them in consecutive order and then passes them on to the phoneme encoder 40. Phoneme encoder 40 converts the digitized phonemes to a format compatible with the phoneme printing device 42, where the phonetic equivalents of the words being spoken are printed. Phoneme printing device 42 may preferably be a printer compatible with the phoneme set of the language selected by the library selector switch 25 and containing the printing head combinations covering the selected language's phonemes. FIG. 3 provides an exemplary table for a phoneme set for the English Language with one possible encoding scheme for activating the printing device.

System 10 does not depend on the solution to the more difficult and complex problem of speech recognition for the transcription of speech to typewritten text. Instead of the hundreds of thousands of words in the English language to recognize, system 10 is required to recognize only the 42 word sounds (phonemes), for example, that make up all the words in the English language. Languages other than English are readily amenable to the same approach of speech to type transcription utilizing system 10. Thus, use of typed phoneticized words permits the imitation of the proper language sounds by a reader who need only be familiar with the pronunciation of the phonemes of the language being transcribed.

System 10 is therefore vastly simpler, less costly, easier to implement, more reliable, and more accurate than alternative prior art speech processors.

It will be appreciated by those skilled in the art that the invention could be implemented for testing and/or operation using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A transcriber for transcribing speech, said transcriber comprising:
    a sound transducer for converting said speech to an electrical signal;
    a speech analyzer operable for analyzing said electrical signal and producing a digital signal containing incoming phoneme information, said speech analyzer being operable for measuring an amplitude and frequency content related to said electrical signal to produce said incoming phoneme information, and said speech analyzer being operable for associating a timing sequence with said amplitude and frequency content to produce said incoming phoneme information;
    at least one phonetic library stored in a digital memory, said at least one phonetic library storing a plurality of phonemes; and
    a phoneme sound correlator operable for comparing said digital signal containing incoming phoneme information to said plurality of phonemes stored in said phonetic library, and producing a correlation level for use determining matches between said digital signals and said plurality of phonemes.

2. The transcriber of claim 1 further comprising a match detector for indicating a match between said incoming phoneme information and said plurality of phonemes stored in said phonetic library.

3. The transcriber of claim 2 wherein said match detector is operable for determining said match between said incoming phoneme information and said plurality of phonemes stored in said phonetic library by comparison with a predetermined level of correlation.

4. The transcriber of claim 3 further comprising a phoneme buffer for storing detected phonemes in response to an indication of said match between said incoming phonemes and said plurality of phonemes stored in said phonetic library.

5. The transcriber of claim 4 further comprising a printer for printing phonetic equivalents of said detected phonemes.

6. The transcriber of claim 5 further comprising a phoneme encoder for converting said detected phonemes to a format compatible with said printer.

7. The transcriber of claim 1 wherein said speech analyzer is operable for digitizing said amplitude and frequency content and said timing sequence to produce said digital signal containing incoming phoneme information.

8. A transcriber for transcribing speech, said transcriber comprising:
- a sound transducer for converting said speech, which consists of phonemes, to an electrical signal;
- a system clock for chronologically tracking each incoming phoneme sensed by said sound transducer;
- a speech analyzer operable for producing a digital signal containing incoming phoneme information related to an amplitude, frequency, and timing of said speech;
- a plurality of phonetic phoneme libraries stored in a digital memory, each of said phonetic phoneme libraries storing a plurality of phonemes and a switch for selecting a particular phonetic phoneme library corresponding to a language of said speech;
- a phoneme sound correlator for determining a degree of correlation between said incoming phoneme information and said plurality of phonemes stored in said plurality of phonetic phoneme libraries;
- a match detector for determining a match between said incoming phoneme information and said plurality of phonemes stored in at least one of said plurality of phonetic phoneme libraries by comparison with a predetermined level of correlation;
- a phoneme buffer for storing detected phonetic phonemes and arranging said phonetic phonemes in a proper time sequence according to said system clock, in response to an indication of said match between said incoming phoneme information and said plurality of phonemes stored in said phonetic library;
- a printer for printing phonetic equivalents of said detected phonemes; and
- a phoneme encoder for converting said detected digitized phonemes to a format compatible with said printer.

9. The transcriber of claim 8 wherein one of said phonetic phoneme libraries is an English language phoneme library requiring only 42 phonemes for dynamic transcription of speech.

10. The transcriber of claim 8 wherein said sound transducer further comprises a background noise canceling circuitry assembly and a selectable, adjustable frequency response circuitry assembly.

11. The transcriber of claim 8 further comprising a high fidelity amplifier to amplify said electrical signal to a power level sufficient to permit analysis of an amplitude and a frequency of said signal.

* * * * *